United States Patent Office 3,357,914
Patented Dec. 12, 1967

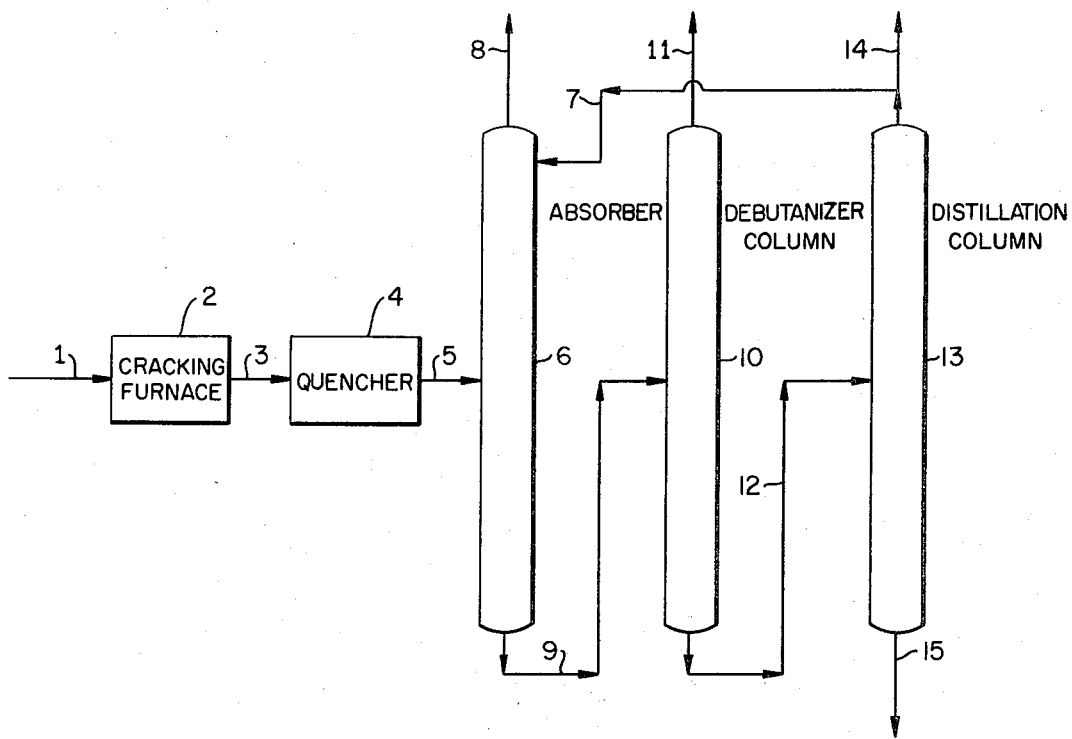

3,357,914
HYDROGENATED PRODUCT OF AN OXIDIZED
DEBUTANIZED AROMATIC CONCENTRATE
Wayne V. McConnell and Paul T. Von Bramer, Kingsport, Tenn., assignors to Eastman Kodak Company, Rochester, N.Y., a corporation of New Jersey
Filed Jan. 15, 1964, Ser. No. 337,759
1 Claim. (Cl. 208—22)

This invention relates to novel compositions of matter, their preparation and their use as plasticizer extenders. The novel compositions are prepared from DAC-B, a complex hydrocarbon mixture which is the liquid residual fraction of the debutanized residue from the pyrolysis of a natural gas stream predominantly comprising propane.

DAC-B, also known as Debutanized Aromatic Concentrate-B, is a complex mixture of saturated, olefinically unsaturated and aromatic hydrocarbons having an initial boiling point greater than about 60° C.

Because the composition of DAC-B changes upon heating, it is not practical to conduct a complete ASTM distillation test. However, after hydrogenation, a typical DAC-B sample distills as follows:

ASTM DISTILLATION RANGE

| | Temp., °C. |
|---|---|
| Initial | 68 |
| 5% | 92 |
| 10% | 101 |
| 20% | 119 |
| 30% | 130 |
| 40% | 143 |
| 50% | 158 |
| 60% | 182 |
| 70% | 203 |
| 80% | 235 |
| 90% | 283 |
| 93% | 316 |

Bottoms 4%.
Loss 3%.

Other tests have determined that samples of DAC-B contain from about 87% to about 91% carbon and from about 9% to about 13% hydrogen and have an iodine member ranging from about 195 to about 350.

Though it is not practical to fully analyze DAC-B we have determined that it contains at least 70 different compounds some of the more important of which are toluene, mixed xylenes, styrene, 5 - methylbicyclohept - 2 - ene and 6-methylene-5-methylbicyclohept-2-ene.

The exact composition of DAC-B varies and depends on, among other things, the composition of the natural gas cracking feed, the temperature and pressure in the cracking furnace, the residence time in the cracking furnace, the operating temperatures and pressures in distillation columns used in recovering the pyrolysis products, etc.

The preparation of DAC-B is illustrated in the figure, a schematic flow diagram of a typical process for preparing DAC-B.

The natural gas cracking feed, consisting predominantly of propane is passed via line 1 into cracking furnace 2 where it is heated to a temperature of about 700° C. to about 800° C. at a pressure of about 10 to about 75 pounds per square inch guage (hereafter referred to as p.s.i.g.) for a period of about 1 second. The effluent gas is removed from the cracking furnace via line 3 and is quenched in quencher 4 and passed via line 5 into absorber 6 where it flows upward countercurrent to an absorption oil introduced into absorber 6 via line 7. Components of the effluent gas having more than 1 carbon atom are absorbed by the absorption oil. The enriched absorption oil then flows out of the absorber through line 9 and into debutanizer column 10 where i-butane and lower boiling components are removed overhead via line 11. The lean absorption oil, known as DAC or debutanized aromatic concentrate flows out of the debutanizer column via line 12 and into distillation column 13 where is is separated into two fractions by distillation. The overhead fraction, known as DAC-A, is withdrawn via line 7 and removed via line 14 or recycled to absorber 6 as absorption oil. The higher boiling fraction, withdrawn as a residue via line 15, is DAC-B.

We have unexpectedly found that DAC-B can be converted by oxidation into valuable organic compositions that are useful as plasticizer extenders for a variety of synthetic resins. Other valuable organic compositions within the scope of our invention can be prepared by hydrogenating the oxidized DAC-B. The latter compositions are also useful as plasticizer extenders for a number of synthetic resins.

The oxidation of the DAC-B can be carried out by passing molecular oxygen through the DAC-B. Because of its ready availability, air is the preferred source of molecular oxygen.

The molecular oxygen is blown through the DAC-B at a rate of about 0.2 to about 1 cubic foot per hour per pound of DAC-B for a period of about 2 to about 24 hours. When air is used as the oxygen source, the air flow rate is about 1 to about 5 cubic feet per hour per pound of DAC-B.

The DAC-B is maintained at elevated temperature during the oxidation. In general, temperatures of about 70° C. to about 150° C. are preferred. However, higher or lower temperatures can be used if desired.

The oxidation can be carried out with or without the aid of a catalyst. If a catalyst is employed, organic acid salts of metals such as manganese, cobalt, copper or lead are preferred.

The DAC-B which is oxidized can be DAC-B as produced by the procedure previously described or it can be modified prior to the oxidation, e.g., by the removal of low boilers.

In general, the oxidized DAC-B generally has the properties summarized in Table I below. However, in certain instances, compositions having properties outside of the listed ranges may be preferred.

TABLE I

| | |
|---|---|
| Viscosity | [1] 10–500 |
| Iodine No. | 100–200 |
| Percent carbon | 75–85 |
| Percent hydrogen | 7.5–10.0 |
| Density ($d_4^{25°}$) | 0.95–1.15 |
| Refractive index ($D^{20}$) | 1.5250–1.5550 |

[1] Centistokes at 100° F.

The oxidation of the DAC-B can be carried out in any vessel which is provided with suitable means for heating the DAC-B to the desired temperature and for blowing air or other oxygen containing gas through the DAC-B charge.

The following examples illustrate the preparation of oxidized DAC-B.

*Example 1*

The low boilers were removed from a DAC-B sample by distilling the DAC-B up to a temperature of about 40° C. at 1–2 mm. pressure. Five hundred grams of the DAC-B residue was placed into an electrically heated vertical tubular reactor and air was passed through the DAC-B by means of a fritted glass disc in the base of the reactor. The air flow was maintained at 2.5 cubic feet per hour for 16 hours and the temperature was maintained at 110° C. The product was 480 g. of a brown oil, the properties of which are summarized in Table II below.

*Examples 2-11*

Ten other DAC-B samples, each weighing 500 grams, were oxidized under the conditions listed in Table II. The properties of each of the products are summarized in Table II below.

TABLE IV.—PROPERTIES AND ANALYSES OF HYDROGENATED COMPOSITIONS

| Example No. | Viscosity, Centistokes at 100° F. | Iodine No. | $D_4^{25}$ | $n_D^{20}$ | Percent C | Percent H |
|---|---|---|---|---|---|---|
| 12 | 30 | 31 | 0.973 | 1.5070 | 83.9 | 11.4 |
| 13 | 18 | 35 | 0.978 | 1.5054 | 84.9 | 12.0 |

TABLE II.—PREPARATION AND PROPERTIES OF AIR-OXIDIZED COMPOSITIONS

| Example No. | Reaction Conditions | | | | Analyses and Properties | | | | | |
|---|---|---|---|---|---|---|---|---|---|---|
| | Air Flow Rate, Cu. Ft./Hr. | Temp., °C. | Time, Hours | Catalyst [1] | Viscosity, Centistokes at 100° F. | Iodine No. | $D_4^{25}$ | $n_D^{20}$ | Percent C | Percent H |
| 1 | 2.5 | 110 | 16 | None | 225 | 144 | 1.062 | 1.5414 | 80.7 | 8.8 |
| 2 | 2.5 | 113 | 5 | do | 22 | 186 | 0.993 | 1.5290 | 84.4 | 9.4 |
| 3 | 2.5 | 112 | 8 | do | 36 | 165 | 1.010 | 1.5323 | 82.0 | 8.8 |
| 4 | 2.5 | 106 | 24 | do | >1,000 | 137 | 1.105 | | 77.9 | 8.7 |
| 5 | 1.0 | 109 | 12 | do | 52 | | | 1.5346 | | |
| 6 | 3.5 | 110 | 8 | do | 87 | | | 1.5402 | | |
| 7 | 2.5 | 150 | 8 | do | 291 | 148 | 1.081 | 1.5430 | | |
| 8 | 2.5 | 71 | 16 | do | 57 | 146 | 1.023 | 1.5379 | | |
| 9 | 2.5 | 112 | 7 | Cobalt | >1,000 | | 1.087 | | | |
| 10 | 2.5 | 113 | 8 | Manganese | 754 | | 1.096 | | | |
| 11 | 2.5 | 108 | 8 | Copper | >1,000 | | 1.079 | | | |

[1] The catalysts were used in 0.1% (based on the metal ion) concentration. The octanoate and naphthenate salts of the metals gave similar results.

In certain instances, plasticizer extenders having less color and odor than oxidized DAC-B are desired. Such plasticizer extenders can be prepared by hydrogenating the oxidized DAC-B.

The oxidized DAC-B can be hydrogenated with molecular hydrogen at elevated temperature and pressure in the presence of a metallic hydrogenation catalyst.

The hydrogenation can be carried out continuously or by the batch in a suitable autoclave. Temperatures of 100° C. to 300° C. and hydrogen pressures of 1500 p.s.i. to 4500 p.s.i. are useful with temperatures of 150° C. to 280° C. and hydrogen pressures of 2500 p.s.i. to 3500 p.s.i. being preferred. Hydrogenation catalysts containing nickel are generally preferred.

In general, the hydrogenated oxidized DAC-B has the properties listed in Table III below. However, in certain instances, compositions having properties outside the listed ranges may be preferred.

TABLE III

| | |
|---|---|
| Viscosity | [1] 10–300 |
| Iodine No. | 5–80 |
| Percent carbon | 78–86 |
| Percent hydrogen | 10.5–12.5 |
| Density ($d_4^{25°}$) | 0.93–1.05 |
| Refractive Index ($D^{20}$) | 1.495–1.520 |

[1] Centistokes at 100° F.

The following examples illustrate the novel hydrogenated oxidized DAC-B compositions and their preparation.

*Example 12*

Five hundred grams of oxidized DAC-B, prepared by the method of Example 1, was placed in an autoclave and hydrogenated in the presence of a nickel catalyst, Harshaw Ni–0104, at a temperature of 250° C. and a hydrogen pressure of 3000 p.s.i. for 8 hours. The properties of the light straw colored product are summarized in Table IV below.

*Example 13*

Five hundred grams of oxidized DAC-B, prepared by the method of Example 3 was hydrogenated for 1 hour under the general conditions of Example 12. The properties of the light straw colored product are summarized in Table IV below.

The oxidized DAC-B and the hydrogenated, oxidized DAC-B are both useful as plasticizer extenders for synthetic resins. In accordance with our invention, we prepare synthetic resin compositions containing up to 100 parts of the novel products of our invention per 100 parts of primary plasticizer. The resulting resin containing the novel products of our invention as plasticizer extenders have properties which are equal to or superior to resins containing conventional plasticizers and are considerably less expensive because of the relative inexpensiveness of the oxidized DAC-B or the hydrogenated, oxidized DAC-B as compared to conventional plasticizers.

The novel DAC-B products within the scope of our invention may be incorporated into synthetic resins such as poly(vinylchloride), cellulose acetate butyrate and poly (methyl methacrylate) by conventional techniques. A preferred embodiment of our invention comprises a plasticized synthettic resin prepared by mixing the resin with conventional stabilizers and plasticizers and the novel DAC-B products of our invention and milling the resulting mix at elevated temperatures.

Thus, we have prepared resinous compositions comprising poly(vinyl chloride) and oxidized DAC-B or hydrogenated oxidized DAC-B by mixing the poly(vinyl chloride), the DAC-B product and any other additives and milling the mixture on a 2-roll mill for 4 to 7 minutes at a temperature of 163° C.

The properties of the resulting novel resinous compositions are summarized in Table V below which also contains a summary of similar properties of a conventionally plasticized resin for comparative purposes.

Thus, by our invention we have provided novel oxidized and hydrogenated oxidized DAC-B compositions which are useful as plasticizer extenders in the preparation of novel resinous products of exceptional value.

Our invention has been described in considerable detail with particular reference to certain preferred embodiments thereof, but it will be understood that variations and modifications can be effected within the spirit and scope of the invention as described hereinbefore, and as defined in the appended claims.

TABLE V

| Formulation | | | | | | | |
|---|---|---|---|---|---|---|---|
| PVC Resin (Geon 101 EP) | 100 | 100 | 100 | 100 | 100 | 100 | |
| Epoxy Resin (Ferro 990) | 2 | 2 | | | | | |
| Cadmium Salt (Staflex OY) | 2 | 2 | | | | | DOP 50 PHR |
| Barium-Cadmium-Zinc Salt (Ferro 1234) | | | 2 | 2 | 2 | 2 | |
| Plasticizer | | | | | | | |
| Di-(2-ethylhexyl)phthalate (DOP) | 40 | 30 | 30 | 25 | 30 | 25 | |
| Commercial Secondary Plasticizer | | | | | | | |
| Oxidized DAC-B from Example 1 | 10 | 20 | | | | | |
| Oxidized DAC-B from Example 2 | | | 20 | 25 | | | |
| Oxidized DAC-B from Example 3 | | | | | 20 | 25 | |
| Hydrogenated, Oxidized DAC-B from Example 12 | | | | | | | |
| Hydrogenated, Oxidized DAC-B from Example 13 | | | | | | | |
| Total Parts of Plasticizer, PHR | 50 | 50 | 50 | 50 | 50 | 50 | |

| Properties | ASTM Method | | | | | | | |
|---|---|---|---|---|---|---|---|---|
| Tensile Strength, p.s.i | D638 | 3,080 | 3,280 | 3,180 | 3,140 | 3,170 | 3,210 | 2,850 |
| 100% Modulus, p.s.i | D638 | 1,850 | 2,320 | 2,190 | 2,180 | 2,240 | 2,420 | 1,500 |
| Ultimate Elongation, percent | D638 | 340 | 300 | 340 | 320 | 330 | 310 | 400 |
| Elongation Retention, percent | | 0 | 0 | 0 | 0 | 0 | 0 | 20 |
| Tear Resistance, PPI | D1004 | 400 | 590 | 550 | 570 | 550 | 600 | 380 |
| Shore "A" Durometer Hardness, 5 sec | D1706 | 94 | 95 | 93 | 92 | 89 | 91 | 83 |
| Soapy Water Ext. (1% soln.): Loss, percent | D1239 | 0.7 | 1.0 | 1.3 | 1.3 | 1.3 | 1.1 | 0.5 |
| Oil Extraction: Loss, percent | D1239 | 4.1 | 0.8 | 2.0 | 1.5 | 2.0 | 1.2 | |
| Heptane Extraction: Loss, percent | D1239 | 17 | 11 | 12.7 | 10.9 | 12.4 | 10.2 | 24 |
| Activated Carbon Extraction: | | | | | | | | |
| Loss, percent | D1203 | 2.3 | 3.9 | 4.9 | 6.0 | 4.9 | 4.8 | 1.5 |
| Thickness, mils | | 16 | 15 | 14 | 12 | 12 | 13 | 10 |
| Torsion Modulus °C.: | | | | | | | | |
| 35,000 p.s.i | D1043 | −17 | −8 | −8 | −6 | −7 | −5 | −25 |
| 135,000 p.s.i | D1043 | −41 | −33 | −33 | −29 | −32 | −27 | −49 |

| Formulation | | | | | | | |
|---|---|---|---|---|---|---|---|
| PVC Resin (Geon 101 EP) | 100 | 100 | 100 | 100 | 100 | 100 | |
| Epoxy Resin (Ferro 990) | | | 2 | 2 | | | |
| Cadmium Salt (Staflex OY) | | | 2 | 2 | | | DOP 50 PHR |
| Barium-Cadmium-Zinc Salt (Ferro 1234) | | | | | 2 | 2 | |
| Plasticizer | | | | | | | |
| Di-(2-ethylhexyl)phthalate (DOP) | 40 | 30 | 40 | 30 | 30 | 25 | |
| Commercial Secondary Plasticizer | 10 | 20 | | | | | |
| Oxidized DAC-B from Example 1 | | | | | | | |
| Oxidized DAC-B from Example 2 | | | | | | | |
| Oxidized DAC-B from Example 3 | | | | | | | |
| Hydrogenated, Oxidized DAC-B from Example 12 | | | 10 | 20 | | | |
| Hydrogenated, Oxidized DAC-B from Example 13 | | | | | 20 | 25 | |
| Total Parts of Plasticizer, PHR | 50 | 50 | 50 | 50 | 50 | 50 | |

| Properties | ASTM Method | | | | | | | |
|---|---|---|---|---|---|---|---|---|
| Tensile Strength, p.s.i | D638 | 3,000 | 3,100 | 3,050 | 3,220 | 3,120 | 3,110 | 2,850 |
| 100% Modulus, p.s.i | D638 | 1,700 | 2,000 | 1,750 | 2,320 | 2,210 | 2,380 | 1,500 |
| Ultimate Elongation, percent | D638 | 335 | 315 | 350 | 350 | 350 | 340 | 400 |
| Elongation Retention, percent | | 0 | 0 | 0 | 0 | 0 | 0 | 20 |
| Tear Resistance, PPI | D1004 | 410 | 455 | 450 | 570 | 550 | 580 | 380 |
| Shore "A" Durometer Hardness 5 sec | D1706 | 83 | 88 | 91 | 92 | 91 | 95 | 83 |
| Soapy Water Ext. (1% soln.) loss, percent | D1239 | 1.8 | 2.4 | 0.9 | 0.9 | 1.3 | 1.4 | 0.5 |
| Oil Extraction loss, percent | D1239 | 10 | 9.0 | 4.4 | 1.7 | 2.8 | 1.9 | |
| Heptane Extraction loss, percent | D1239 | 20 | 16 | 19.0 | 13.0 | 14.1 | 11.9 | 24 |
| Activated Carbon Extraction: | | | | | | | | |
| Loss, percent | D1203 | 5.8 | 9.7 | 2.7 | 3.8 | 5.4 | 5.5 | 1.5 |
| Thickness, mils | | 11 | 10 | 14 | 16 | 9 | 10 | 10 |
| Torsion Modulus °C.: | | | | | | | | |
| 35,000 p.s.i | D1043 | −21 | −19 | −22 | −12 | −8 | −8 | −25 |
| 135,000 p.s.i | D1043 | −45 | −42 | −48 | −40 | −38 | −35 | −49 |

We claim:

An organic composition having a viscosity of about 10 to about 300 centistokes at 100° F., an iodine number of about 5 to about 80, a density of about 0.93 to about 1.05, a refractive index of about 1.495 to about 1.520, and containing about 78 to about 86 percent carbon and about 10.5 to about 12.5 percent hydrogen, said organic composition being prepared by (A) oxidizing DAC-B with air by contacting said DAC-B with air at a rate of about one to about five cubic feet of air per hour per pound of DAC-B at a temperature of about 70° C. to about 150° C. and (B) hydrogenating said oxidized DAC-B by contacting said oxidized DAC-B with hydrogen at a temperature of about 100° C. to about 300° C. and a hydrogen pressure of about 1500 to about 4500 p.s.i. in the presence of a nickel hydrogenation catalyst, said DAC-B being a liquid residual fraction of the debutanized residue from the pyrolysis of a natural gas stream predominantly comprising propane and having an iodine number of about 195 to about 350 and containing about 87 to about 91 percent carbon and about 9 to about 13 percent hydrogen.

References Cited

UNITED STATES PATENTS 2,161,599  6/1939  Towne _____ 260—673
2,257,206  9/1941  Throckmorton et al. __ 260—673

(Other references on following page)